US012733622B1

(12) United States Patent
Sheng

(10) Patent No.: US 12,733,622 B1
(45) Date of Patent: Sep. 15, 2026

(54) PET ENCLOSURE

(71) Applicant: Wenjun Sheng, Shenzhen (CN)

(72) Inventor: Wenjun Sheng, Shenzhen (CN)

( * ) Notice: Subject to any disclaimer, the term of this patent is extended or adjusted under 35 U.S.C. 154(b) by 0 days.

(21) Appl. No.: 19/392,609

(22) Filed: Nov. 18, 2025

(30) Foreign Application Priority Data

Nov. 6, 2025 (CN) ......................... 202522357949.3

(51) Int. Cl.
*A01K 1/03* (2006.01)

(52) U.S. Cl.
CPC ..................................... *A01K 1/03* (2013.01)

(58) Field of Classification Search
CPC ........ A01K 1/03; A01K 1/031; A01K 1/0313; A01K 1/0317; A01K 15/0203; A01K 1/0047; A01K 1/032; A01K 1/033; A01K 1/0335; A01K 1/034
See application file for complete search history.

(56) References Cited

U.S. PATENT DOCUMENTS 109,166 A * 11/1870 Achenbach .......... A01K 31/002 135/149
889,596 A * 6/1908 Frits ..................... A01K 31/002 119/492
1,007,956 A * 11/1911 Maurer .................. A01K 31/18 119/491
1,107,871 A * 8/1914 Alkire et al. .......... A01K 1/033 135/117
1,151,671 A * 8/1915 Donaldson ............. A01K 1/033 119/498
2,092,155 A * 9/1937 Hackett .................. A01K 1/033 119/28.5
2,954,007 A * 9/1960 Mitchell ................ A01K 1/033 119/499
3,020,601 A * 2/1962 Stambaugh .......... A47B 47/042 D25/16
3,156,213 A * 11/1964 Patten .................. A01K 1/0254 119/497
3,460,516 A * 8/1969 Leonard ................. A01K 1/033 119/482

(Continued)

FOREIGN PATENT DOCUMENTS

DE 20312724 U1 * 10/2003 ............. A01K 1/033
GB 719496 A * 12/1954 ............. A01K 31/22

(Continued)

*Primary Examiner* — Ebony E Evans
(74) *Attorney, Agent, or Firm* — Law Offices of Sandy Lipkin; Sandy Lipkin

(57) ABSTRACT

A pet enclosure includes a housing. The housing includes an housing space configured for accommodating a pet. The housing includes a frame assembly, a first side panel, and a second side panel. The first side panel and the second side panel are arranged at both sides of the frame assembly respectively. The two side panels are arranged adjacent to each other and are connected together, so as to form the housing space. The frame assembly includes a bottom panel. The first side panel is arranged at an inclined angle relative to the bottom panel, and/or the second side panel is arranged at an inclined angle relative to the bottom panel. The first side panel is provided with a first transparent viewing area, and the second side panel is provided with a second transparent viewing area. The two viewing areas are configured for viewing the pet inside the housing space.

25 Claims, 11 Drawing Sheets

(56) References Cited

U.S. PATENT DOCUMENTS

| | | | | | |
|---|---|---|---|---|---|
| D248,049 | S | * | 5/1978 | Pedigo | D30/114 |
| 4,195,593 | A | * | 4/1980 | Dunn | A01K 1/033<br>119/499 |
| 5,115,762 | A | * | 5/1992 | Long | A01K 1/033<br>119/499 |
| 6,450,123 | B1 | * | 9/2002 | Murray | A01K 1/03<br>119/512 |
| 6,895,898 | B1 | * | 5/2005 | Kitch | A01K 1/033<br>D30/114 |

FOREIGN PATENT DOCUMENTS

| | | | | | |
|---|---|---|---|---|---|
| GB | 2448559 | A | * | 10/2008 | A01K 31/08 |
| KR | 20090074856 | A | * | 7/2009 | A01K 1/033 |

* cited by examiner

PET ENCLOSURE

CROSS-REFERENCE TO RELATED APPLICATIONS

The application claims priority of Chinese patent application CN2025223579493, filed on Nov. 6, 2025, disclosure of which is incorporated herein by reference in its entirety.

TECHNICAL FIELD

The present disclosure relates to the technical field of pet keeping, in particular to a pet enclosure.

BACKGROUND

Pet enclosures, such as those for small pets like hamsters and lizards, have become common household pet supplies. Conventional pet enclosures typically employ a simple rectangular box structure with side walls that are largely perpendicular to the base. This structure suffers from significant limitations. Observers can only view the pet from the front or a limited number of sides, resulting in a singular viewing angle. This prevents a comprehensive, multi-angle observation of the pet's natural activities.

Therefore, the present disclosure provides a new pet enclosure. This pet enclosure not only provides all-around viewing experience, but also features a stable and reliable structure along with excellent sealing effectiveness, thereby preventing the pet inside the pet enclosure from escaping or the bedding material from leaking.

SUMMARY

In order to overcome shortcomings of the existing technology, the present disclosure provides a pet enclosure. The pet enclosure not only can provide all-around viewing experience, but also features a stable and reliable structure along with excellent sealing effectiveness, so as to prevent a housed pet from escaping or the bedding material from leaking.

The technical solution adopted by the present disclosure to solve the technical problems is as follows.

The pet enclosure includes a housing, and the housing is provided with an housing space configured for accommodating a pet. The housing includes a frame assembly, a first side panel, and a second side panel. The first side panel and the second side panel are arranged at both sides of the frame assembly respectively. The first side panel and the second side panel are arranged adjacent to each other and are connected together, so as to form the housing space. The frame assembly includes a bottom panel. The first side panel and the second side panel are each arranged at an inclined angle relative to the bottom panel. The first side panel is provided with a first transparent viewing area, and the second side panel is provided with a second transparent viewing area. The first viewing area and the second viewing area are configured for viewing the pet inside the housing space.

In present embodiment, the first side panel and the second side panel are arranged at an angle relative to the bottom panel, thereby enhancing the overall structural rigidity of the housing. In addition, the inclined first viewing area and second viewing area can help to minimize reflection interference, so as to ensure a clearer and more natural viewing image and improve the observer's viewing experience. Furthermore, the first side panel and the second side panel are arranged adjacent to each other, thereby providing a broader viewing surface with a wider field of view. This allows users to observe the pet from multiple angles without moving, so as to reduce visual dead zones.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
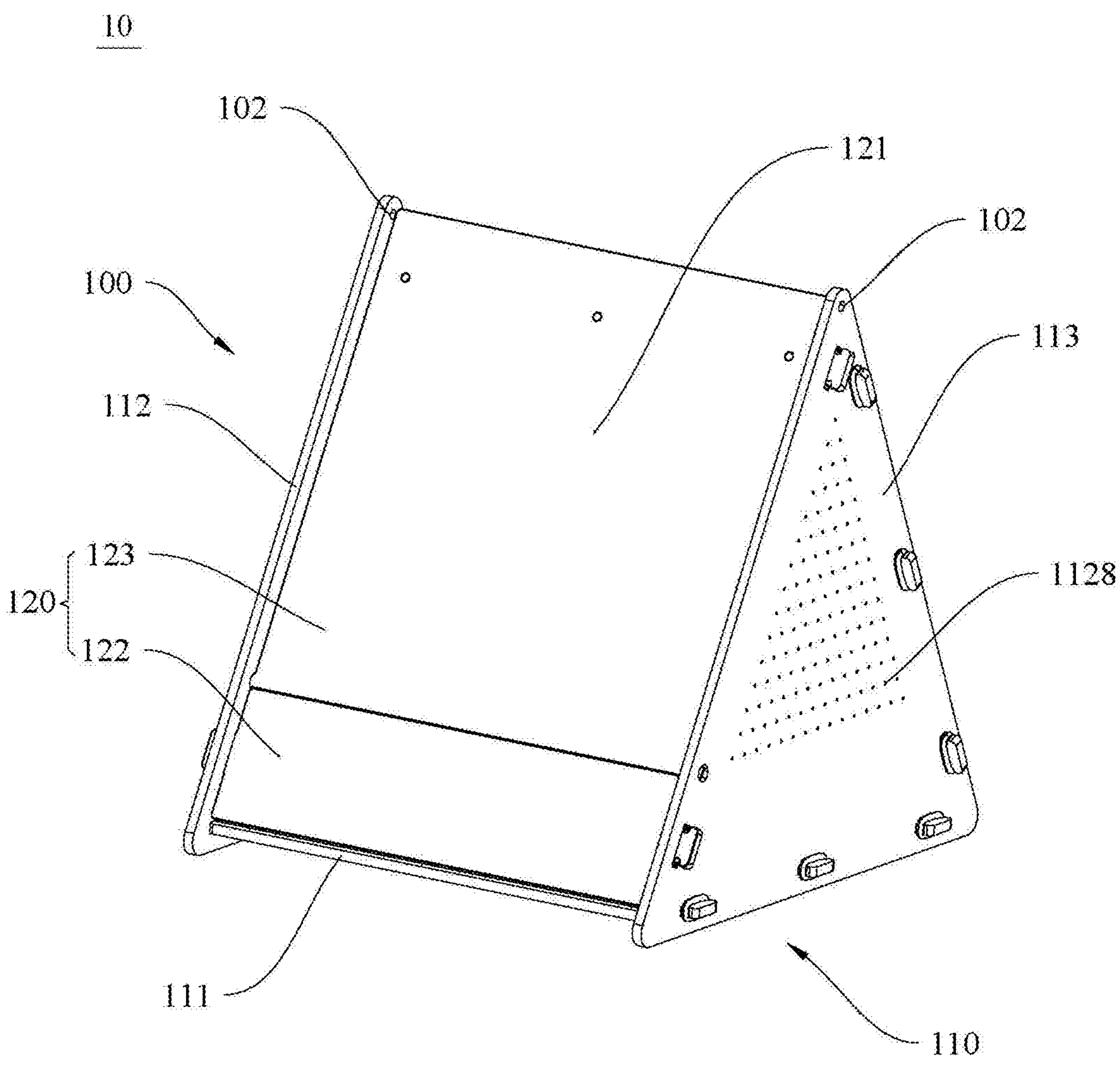
FIG. 1 is an overall structural diagram of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
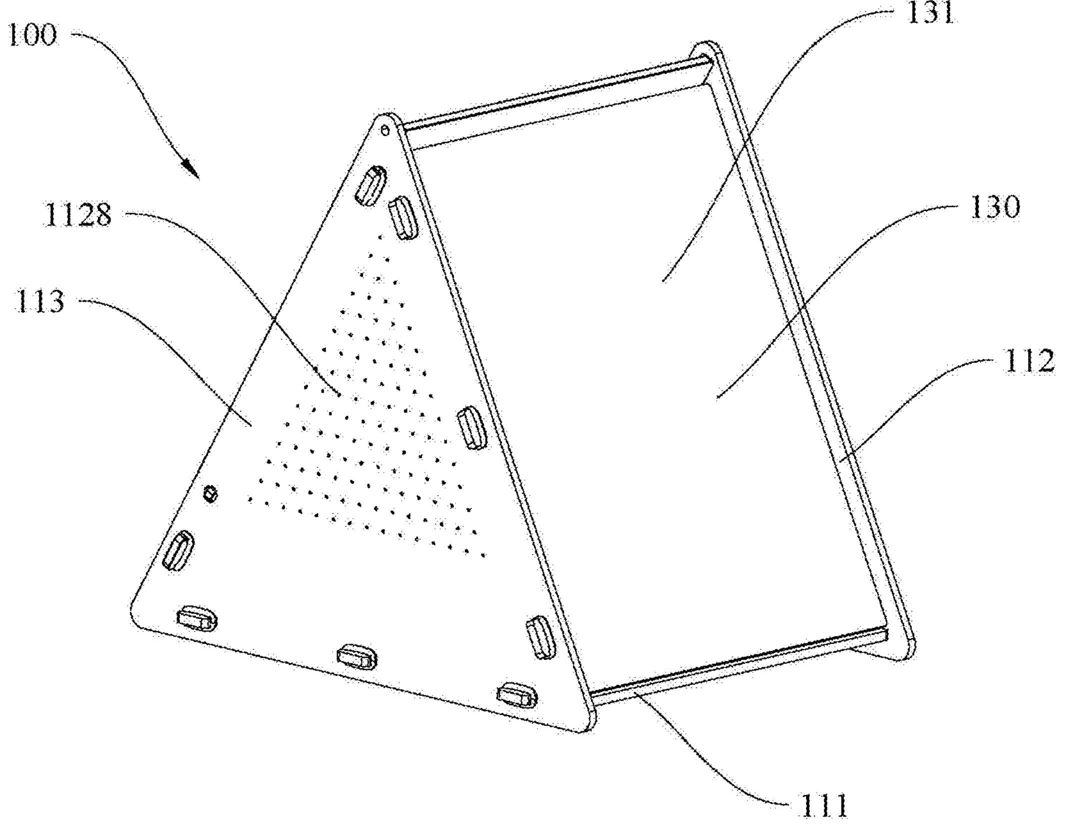
FIG. 2 is an overall structural diagram of another perspective of the present disclosure.
Figure 3:
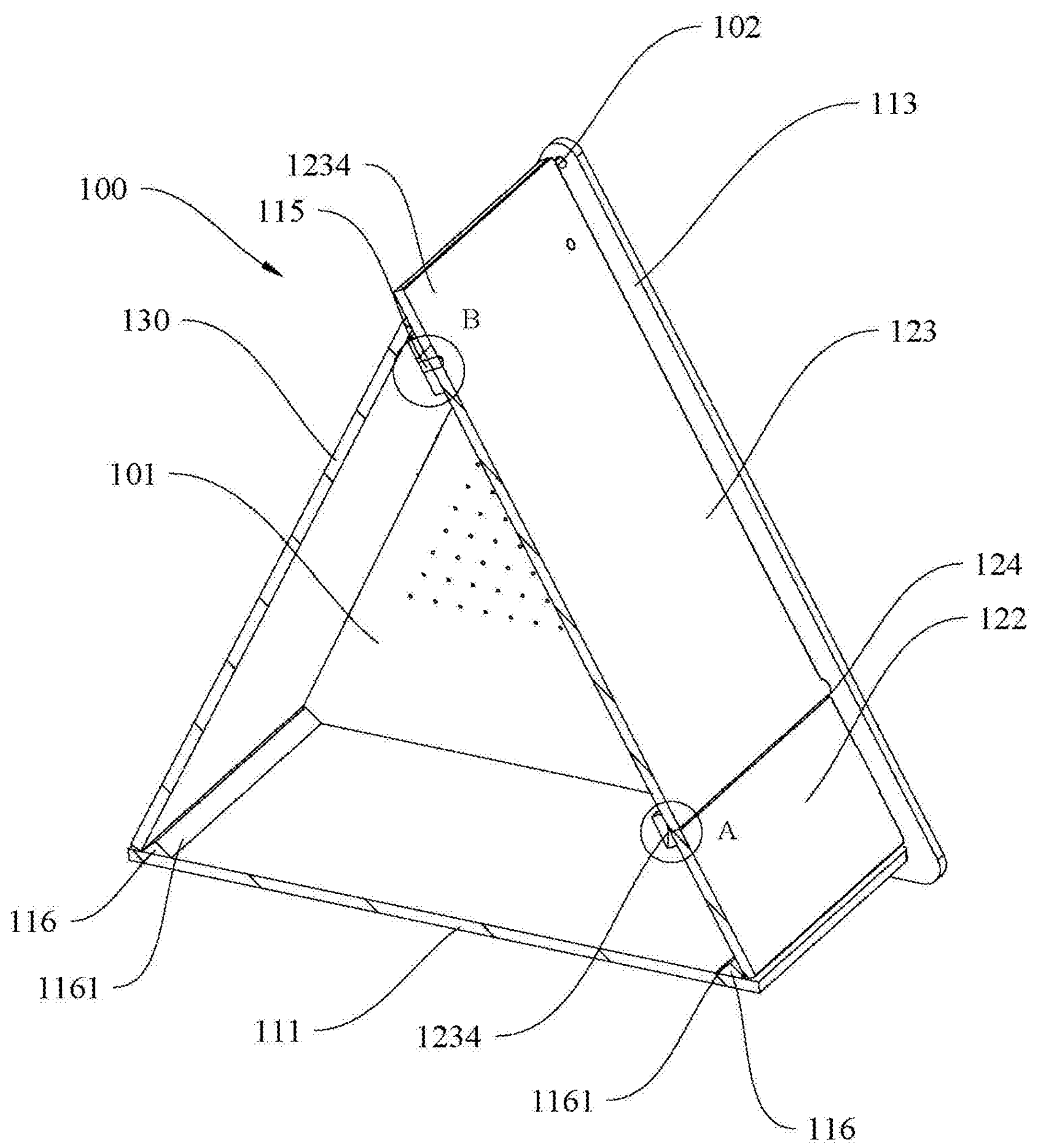
FIG. 3 is a sectional view of the present disclosure.

The present disclosure provides a pet enclosure (i.e., a pet cage) 10. Referring to FIG. 1-FIG. 3, the pet enclosure 10 includes a housing 100, and the housing 100 is provided with a housing space 101 configured for accommodating a pet. The housing 100 includes a frame assembly 110, a first side panel 120, and a second side panel 130. The first side panel 120 and the second side panel 130 are arranged at both sides of the frame assembly 110 respectively. The first side panel 120 and the second side panel 130 are arranged adjacent to each other and are connected together, so as to form the housing space 101. The frame assembly 110 includes a bottom panel 111. The first side panel 120 and the second side panel 130 are each arranged at an inclined angle relative to the bottom panel 111. The first side panel 120 is provided with a first transparent viewing area 121, and the second side panel 130 is provided with a second transparent viewing area 131. The first viewing area 121 and the second viewing area 131 are configured for viewing the pet inside the housing space 101. In present embodiment, the first side panel 120 and the second side panel 130 are arranged at an angle relative to the bottom panel 111, thereby enhancing the overall structural rigidity of the housing 100. In addition, the inclined first viewing area 121 and second viewing area 131 can help to minimize reflection interference, so as to ensure a clearer and more natural viewing image and improve the observer's viewing experience. Furthermore, the first side panel 120 and the second side panel 130 are arranged adjacent to each other, thereby providing a broader viewing surface with a wider field of view. This allows users to observe the pet from multiple angles without moving, so as to reduce visual dead zones. In other embodiments, the first side panel 120 is arranged at an inclined angle relative to the bottom panel 111, or the second side panel 130 is arranged at an inclined angle relative to the bottom panel 111.

Preferably, the first viewing area 121 extends from a top end of the first side panel 120 to a bottom end of the first side panel 120. The second viewing area 131 extends from a top end of the second side panel 130 to a bottom end of the second side panel 130. Therefore, this arrangement provides a broader field of view, thereby enabling the observer to view the pet inside the housing space 101 more clearly from multiple angles.

In present embodiment, referring to FIG. 5-FIG. 9, the first side panel 120 and the second side panel 130 are detachably connected to the frame assembly 110, which enables users to assemble and disassemble the housing 100 easily and quickly. Specifically, both end side walls of the first side panel 120 and of the second side panel 130 are respectively provided with at least one first engaging column 1221, and two sides of the frame assembly 110 are respectively provided with at least one first receiving hole 1121. The first engaging column 1221 is inserted into the first receiving hole 1121, so that the first side panel 120 and the second side panel 130 are detachably connected to the frame assembly 110. Preferably, a first sealing rubber ring 1222 is arranged between the first engaging column 1221 and the first receiving hole 1121. A first engaging recess 1223 is defined in the first engaging column 1221, and the first sealing rubber ring 1222 is arranged on the first engaging recess 1223, so as to seal a first connection gap 1224 between the first engaging column 1221 and the first receiving hole 1121.

In present embodiment, by arranging the first sealing rubber ring 1222, the first side panel 120 and the second side panel 130 are stably connected to the frame assembly 110. Furthermore, when the pet is small in size, the first sealing rubber ring 1222 functions to seal the first connection gap 1224 between the first engaging column 1221 and the first receiving hole 1121, so as to prevent the pet from escaping through the gap.

Preferably, the frame assembly 110 further includes a left side panel 112 and a right side panel 113 arranged opposite to the left side panel 112. A first side of the left side panel 112 and a first side of the right side panel 113 are each provided with three first receiving holes 1121. Both end side walls of the second side panel 130 are respectively provided with three first engaging columns 1221 corresponding to the first receiving holes 1121. The first engaging column 1221 is inserted into the first receiving hole 1121, so that the second side panel 130 is detachably connected to the frame assembly 110. By arranging three first receiving holes 1121 and three first engaging columns 1221, the connection strength among the second side panel 130, the left side panel 112, and the right side panel 113 is significantly enhanced, so as to prevent looseness during use or movement.

In other embodiments, the first side panel 120 and the second side panel 130 are fixedly connected to the frame assembly 110. Specifically, the first side panel 120 and the second side panel 130 can be fixedly connected to the frame assembly 110 by adhesive bonding, welding, or other connection methods, thereby enabling the pet enclosure 10 to have a more stable structure. In addition, the first side panel 120 and the second side panel 130 may also be integrally formed with the frame assembly 110.

In present embodiment, an opening 114 is formed between a second side of the left side panel 112 and a second side of the right side panel 113. The first side panel 120 includes a lower side panel 122 and an upper side panel 123. The lower side panel 122 is detachably connected to a lower side of the frame assembly 110. The upper side panel 123 is rotatably connected to the frame assembly 110, so as to cover the opening 114. An inner wall of the upper side panel 123 abuts against a top edge of the second side panel 130.

Figure 5:
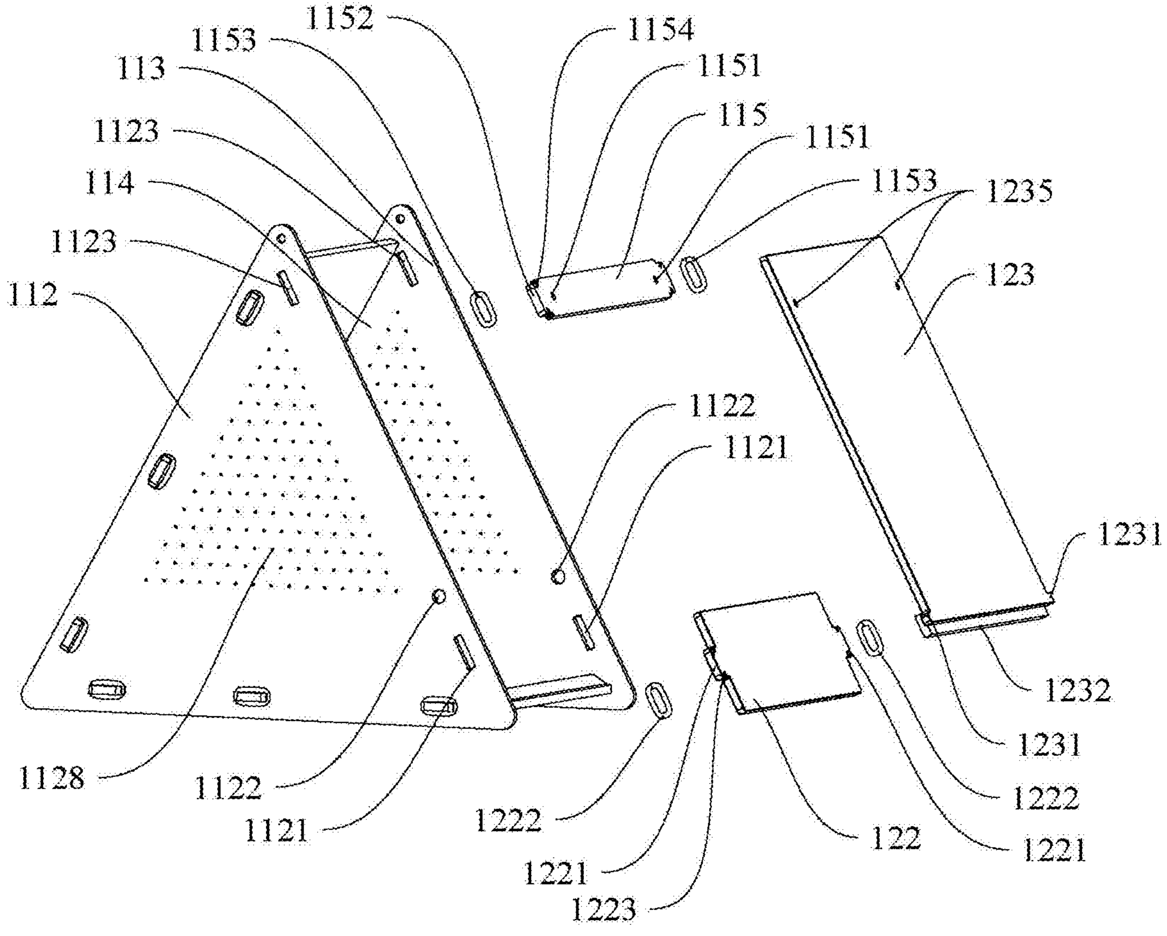
FIG. 5 is an exploded view of the connection structure between a first side panel and a frame assembly.
Figure 6:
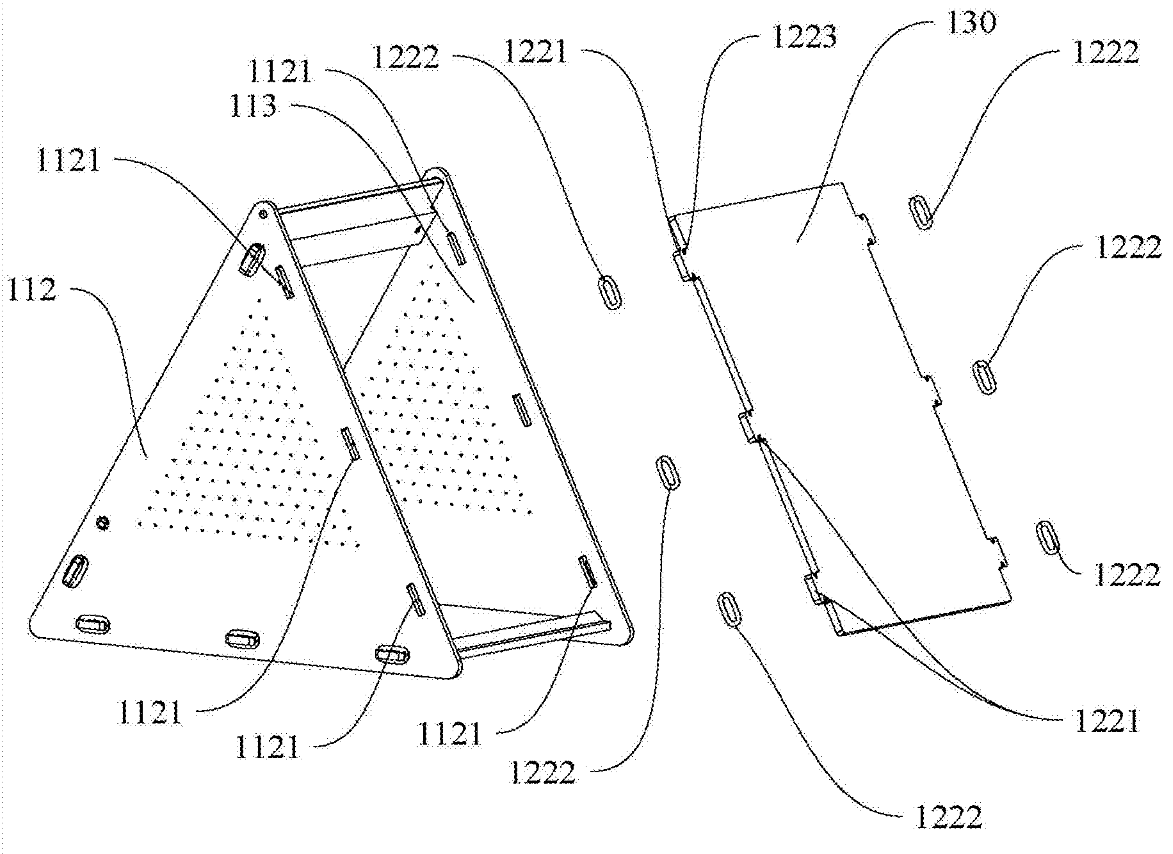
FIG. 6 is an exploded view of the connection structure between the second side panel and the frame assembly.
Figure 7:
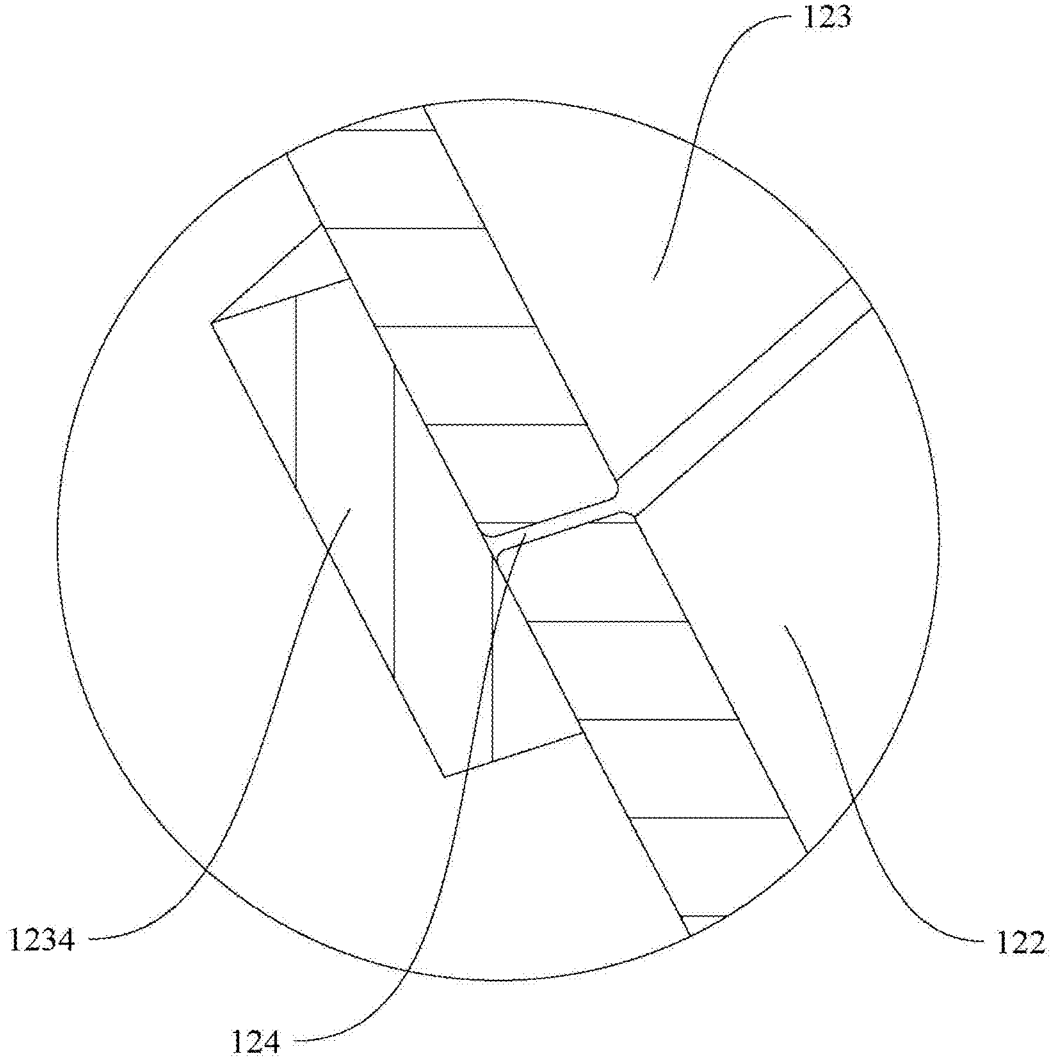
FIG. 7 is a partial enlarged view of area A in FIG. 3.

Referring to FIG. 5, first engaging columns 1221 are arranged on both ends of the lower side panel 122. The first engaging columns 1221 are inserted into the first receiving holes 1121 defined in two sides of the frame assembly 110. Therefore, the lower side panel 122 is detachably connected to the frame assembly 110, so that the lower side panel 122 can be rapidly detached and mounted. In this way, this facilitates cleaning, replacement, or temporary opening of a bottom area of the pet enclosure. Protruding shafts 1231 are arranged at both sides of a bottom end of the upper side panel 123. Connecting holes 1122 are defined in both the left side panel 112 and the right side panel 113 of the frame assembly 110. The protruding shaft 1231 is rotatably arranged in the connecting hole 1122, so that the bottom end of the upper side panel 123 is rotatably connected to the frame assembly 110. Both ends of the upper side panel 123 are rotatably connected to the left side panel 112 and the right side panel 113. Therefore, this allows users to easily open or close the opening 114 of the pet enclosure for routine operations, such as feeding or observing the pet. In other embodiments, the upper side panel 121 and the lower side panel 122 may be rotatably connected via a hinge.

Figure 8:
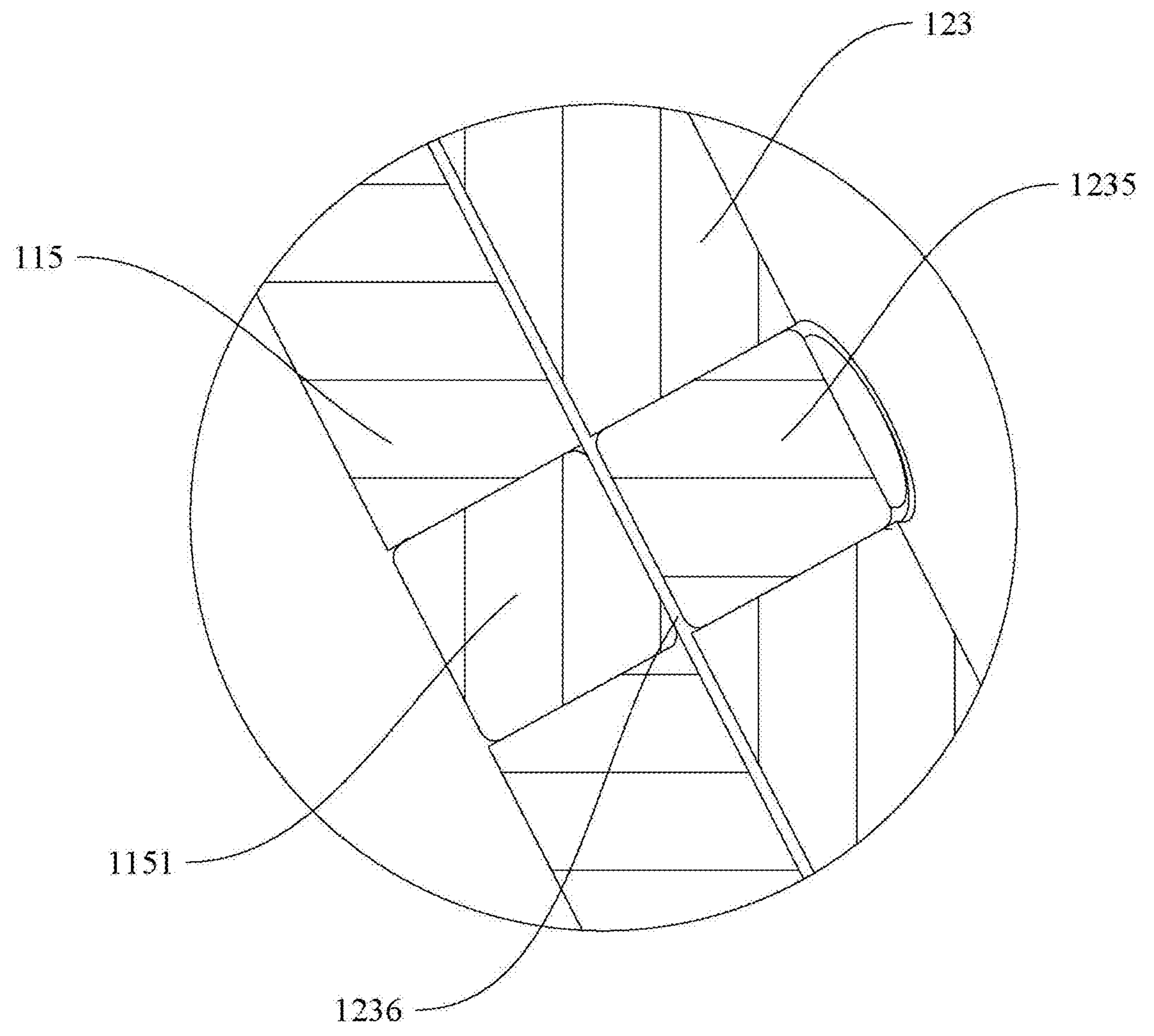
FIG. 8 is a partial enlarged view of area B in FIG. 3.

In present embodiment, referring to FIG. 5 and FIG. 8, an extension panel 1232 is arranged on an inner side wall of the bottom end of the upper side panel 123. When the upper side panel 123 covers the opening 114, an inner wall surface of the extension panel 1232 abuts against an inner wall surface of the lower side panel 122, so as to cover a first gap 124 between the upper side panel 123 and the lower side panel 122. Two end portions of the extension panel 1232 are configured for covering a second connection gap 1233 between the protruding shaft 1231 and an inner side of the connecting hole 1122. Therefore, the pet enclosure is sealed, so as to prevent small pets from escaping from the housing space 101. Moreover, this also can prevent foreign matter from entering the pet enclosure through the first gap 124.

To facilitate users' opening and closing operations of the opening 114, in present embodiment, a top end of the upper side panel 123 is further provided with an extension portion 1234. This allows users to grip on the extension portion 1234 directly without requiring any tools, so that users are enabled to easily and smoothly open the upper side panel 123, and the operations become smoother. In present embodiment, referring to FIG. 3, FIG. 4, and FIG. 8, the upper side panel 123 is magnetically connected to the housing 100. At least one first magnetic member 1235 is arranged on the top end of the upper side panel 123. A protective nesting partition 115 is arranged between the frame assemblies 110, and at least one second magnetic member 1151 is arranged on the protective nesting partition 115. The first magnetic member 1235 is magnetically connected to the second magnetic member 1151, so that the upper side panel 123 is capable of covering the opening 114. Preferably, the top end of the upper side panel 123 is provided with two first magnetic member 1235. The protective nesting partition 115 is provided with two second magnetic member 1151 corresponding to the first magnetic member 1235. In addition, when the upper side panel 123 covers the opening 114, a second gap 1236 is formed between the first magnetic member 1235 and the second magnetic member 1151. The upper side panel 123 is magnetically connected to the second magnetic member 1151 on the protective nesting partition 115 via the first magnetic member 1235. Therefore, users can effortlessly perform the opening and closing operation. Furthermore, the second gap 1236 is formed between the first magnetic member 1235 and the second magnetic member 1151, so as to prevent direct contact between the first magnetic member 1235 and the second magnetic member 1151. This configuration helps to reduce the magnetic attraction force, thereby establishing a more secure connection between the upper side panel 123 and the protective nesting partition 115, which extends service life of the magnetic members.

Figure 9:
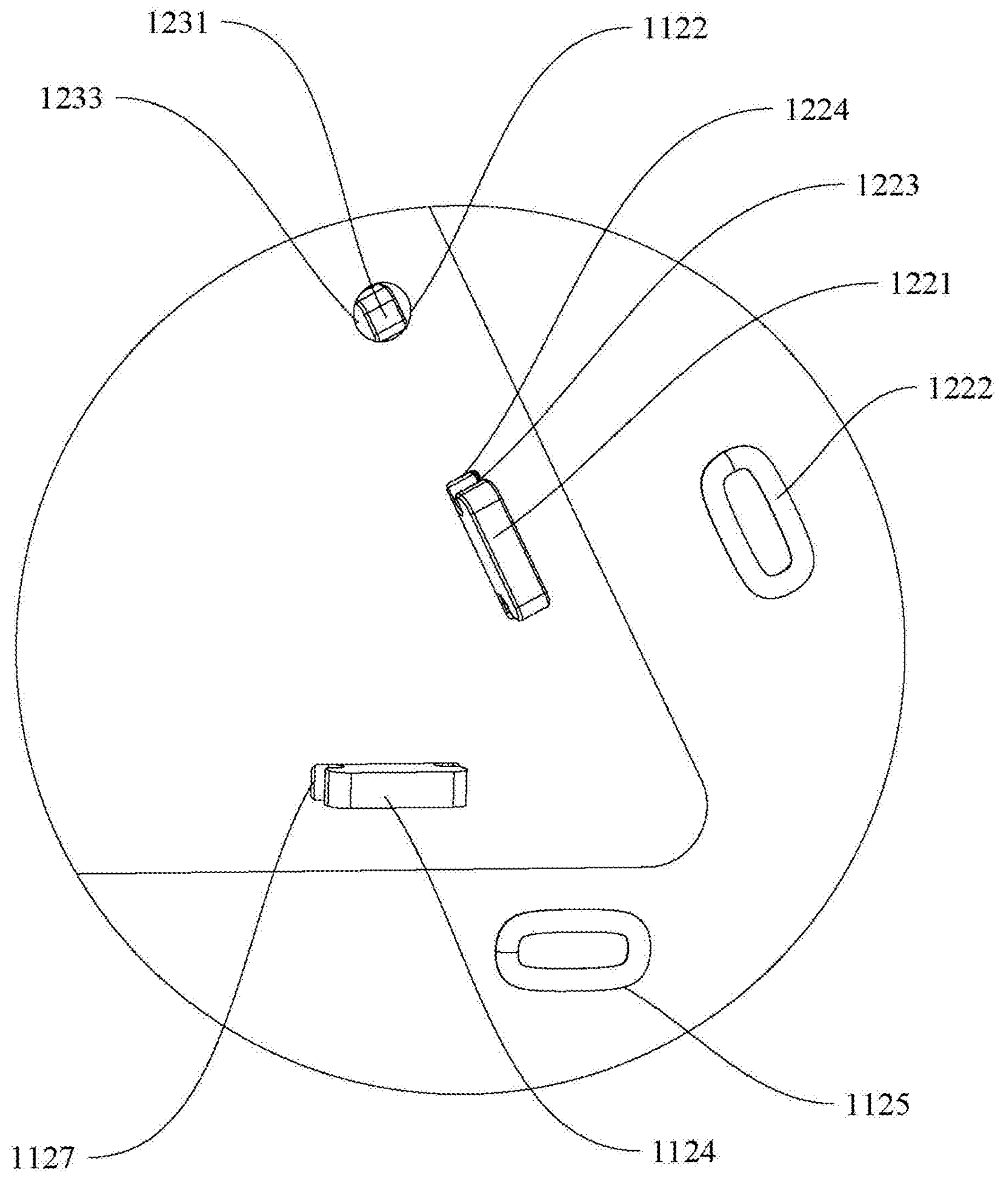
FIG. 9 is a partial enlarged view of a first connection gap, a second connection gap, and a fourth connection gap.
Figure 10:
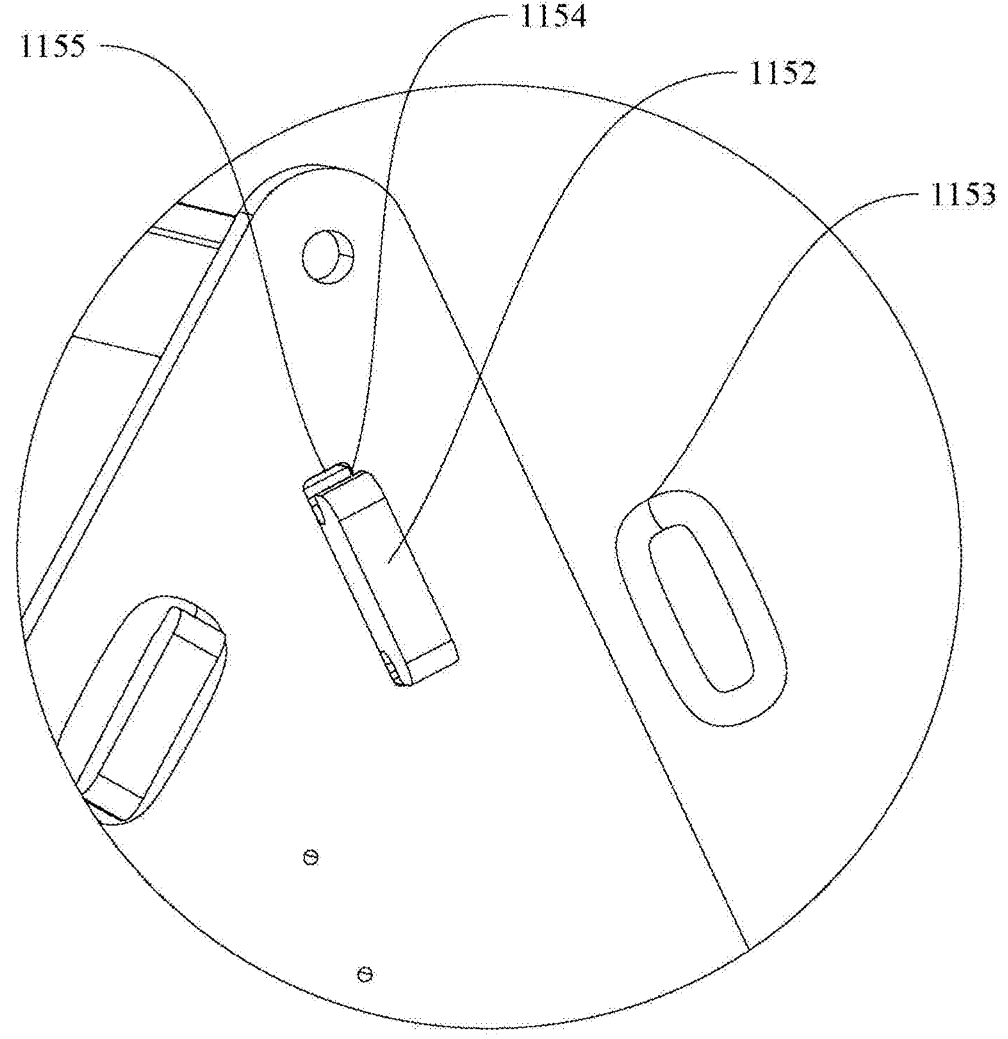
FIG. 10 is a partial enlarged view of a third connection gap.

In present embodiment, referring to FIG. 5 and FIG. 9, the protective nesting partition 115 is detachably connected to the frame assembly 110. Specifically, both ends of the protective nesting partition 115 are each provided with at least one second engaging column 1152. The left side panel 112 and the right side panel 113 of the frame assembly 110 are each provided with at least one second receiving hole 1123. The second engaging column 1152 is inserted into the second receiving hole 1123, so that the protective nesting partition 115 is detachably connected to the frame assembly 110. A second sealing rubber ring 1153 is arranged between the second engaging column 1152 and the second receiving hole 1123. A second engaging recess 1154 is defined in the second engaging column 1152, and the second sealing rubber ring 1153 is arranged on the second engaging recess 1154, so as to seal a third connection gap 1155 between the second engaging column 1152 and the second receiving hole 1123. Through the above structure, the quick disassembly and assembly between the protective nesting partition 115 and the frame assembly 110 is achieved. In addition, this also ensures that the protective nesting partition 115 is stably and reliably connected to the frame assembly 110. The second sealing rubber ring 1153 is configured for filling the third connection gap 1155 the second engaging column 1152 and the second receiving hole 1123. Therefore, this prevents pets of excessively small size from crawling out through the gap, and prevents foreign matter from entering the housing space 101 and polluting the breeding environment.

In other embodiments, the protective nesting partition 115 is fixedly connected to the frame assembly 110. Specifically, the protective nesting partition 115 can be fixedly connected to the frame assembly 110 by adhesive bonding, welding, or other connection methods, thereby enabling the pet enclosure 10 to have a more stable structure. In addition, the protective nesting partition 115 may also be integrally formed with the frame assembly 110.

Figure 4:
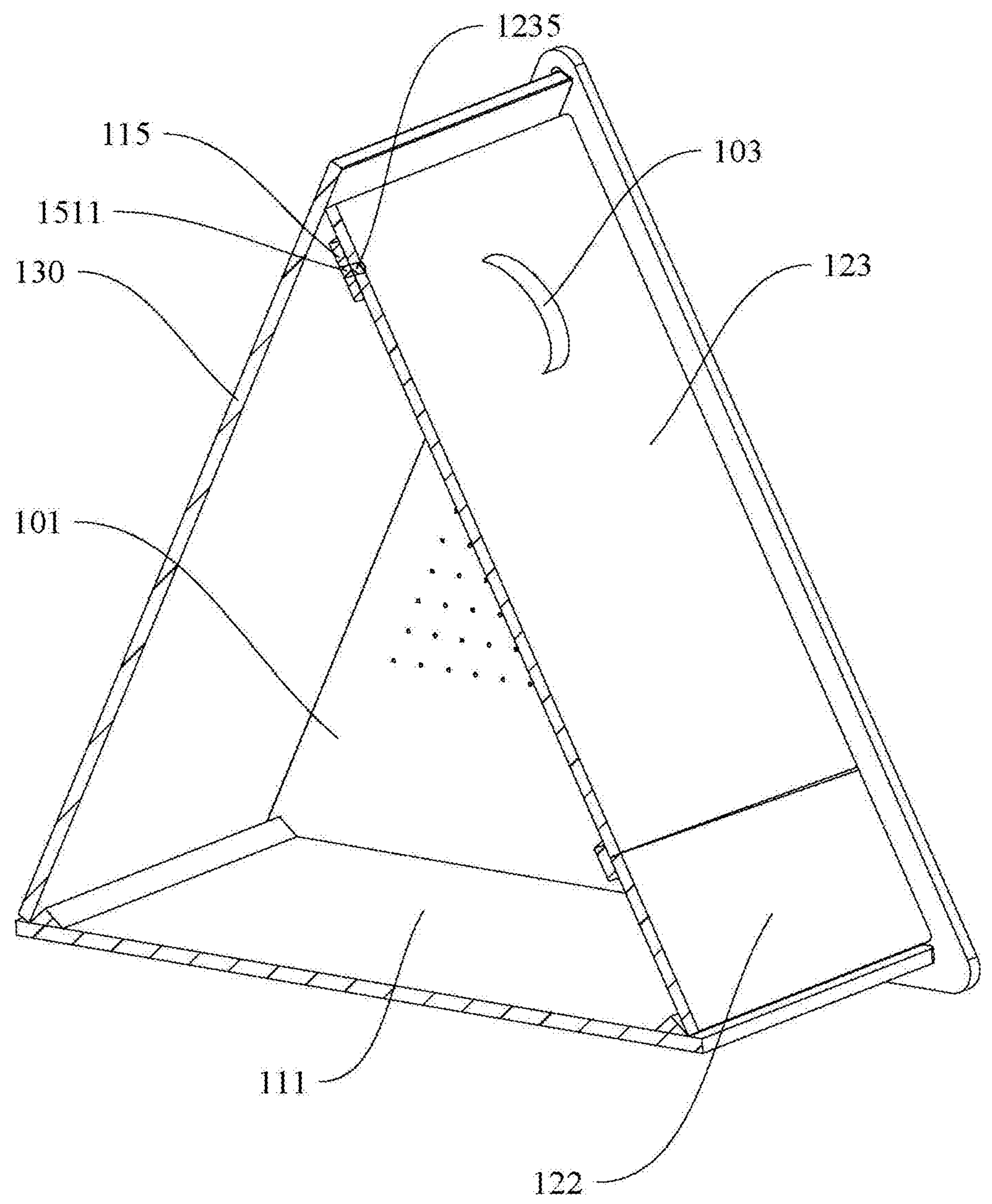
FIG. 4 is a sectional view of a second side panel of another embodiment.

In other embodiments, referring to FIG. 4, an inner wall of the second side panel 130 abuts against a top edge of the first side panel 120. Preferably, a handle 103 is arranged on the first side panel 120, so that users can open the upper side panel 123 of the first side panel 120.

In present embodiment, an area of the upper side panel 123 accounts for 10% to 100% of an area of the first side panel 120. Specifically, the area of the upper side panel 123 in present embodiment accounts for 80% of the area of the first side panel 120. Therefore, it is convenient for users to feed the pets in the housing space 101 or to clean the pet enclosure.

In present embodiment, referring to FIG. 3, blocking bars 116 are arranged on both ends of the bottom panel 111, and outer sides of the blocking bars 116 respectively abut against an inner surface of the first side panel 120 and an inner surface of the second side panel 130. Therefore, this enhance the connection strength among the first side panel 120, the second side panel 130, and the bottom panel 111. The blocking bars 116 are capable of sealing connection gaps among the first side panel 120, the second side panel 130, and the bottom panel 111. Therefore, pets are prevented from escaping from the housing space 101. An inner side of the blocking bar 116 is provided with an inclined guiding surface 1161. The inclined guiding surface 1161 is configured for leading bedding material inside the housing space 101 to be at a central area of the bottom panel 111. This avoids accumulation of the bedding material at corners or gaps. Preferably, the blocking bar 116 has a shape of a triangular prism, a cylinder, a rectangular prism, a polygonal prism, an ellipsoid, or a semi-cylinder. In other embodiments, the blocking bar 116 may be arranged on both ends of the first side panel 120, and/or may be arranged on both ends of the second side panel 130.

In present embodiment, at least one mounting hole 102 is defined in a top end of the housing 100. Preferably, the top end of the left side panel 112 and the top end the right side panel 113 are each provided with one mounting hole 102. The mounting hole is configured for allowing a hanging rope or a pin to pass through, so that the pet enclosure can be suspended or can be carried conveniently. When the upper side panel 123 covers the opening 114, the mounting hole 102 is exposed on an outer side of the upper side panel 123. When the mounting hole 102 is configured for allowing a pin to pass through, the pin inside the mounting hole 102 is configured for retaining the upper side panel 123 in a covered state, so as to prevent the upper side panel 123 from being accidentally opened. When the mounting hole 102 is configured for allowing a hanging rope to pass through, the hanging rope may only be threaded through the mounting hole 102 of the left side panel 112, or may only be threaded through the mounting hole 102 of the right side panel 113. Alternatively, the hanging rope may also be simultaneously threaded through the mounting holes 102 of both the left side panel 112 and the right side panel 113, thereby allowing the pet enclosure to be easily suspended or carried outdoors. The mounting holes 102 are exposed on an exterior of the upper side panel 123, so that users can open the upper side panel 123 without removing the hanging rope.

In present embodiment, the angle between the first side panel 120 and the bottom panel 111 is in a range from 1 degrees to 89.9 degrees, and/or the angle between the second side panel 130 and the bottom panel 111 is in a range from 1 degrees to 89.9 degrees. The angle between the first side panel 120 and the bottom panel 111 is in a range from 1 degrees to 90 degrees. The angle between the second side panel 130 and the bottom panel 111 is in a range from 1 degrees to 89.9 degrees. In other embodiments, the angle between the first side panel 120 and the bottom panel 111 is in a range from 1 degrees to 89.9 degrees, and the angle between the second side panel 130 and the bottom panel 111 is in a range from 1 degrees to 90 degrees. Preferably, the angle between the first side panel 120 and the bottom panel 111 is 60 degrees, and the angle between second side panel 130 and the bottom panel 111 is 60 degrees. Therefore, this can minimize reflections or glare caused by direct light, and can enhance the viewing experience.

Figure 11:
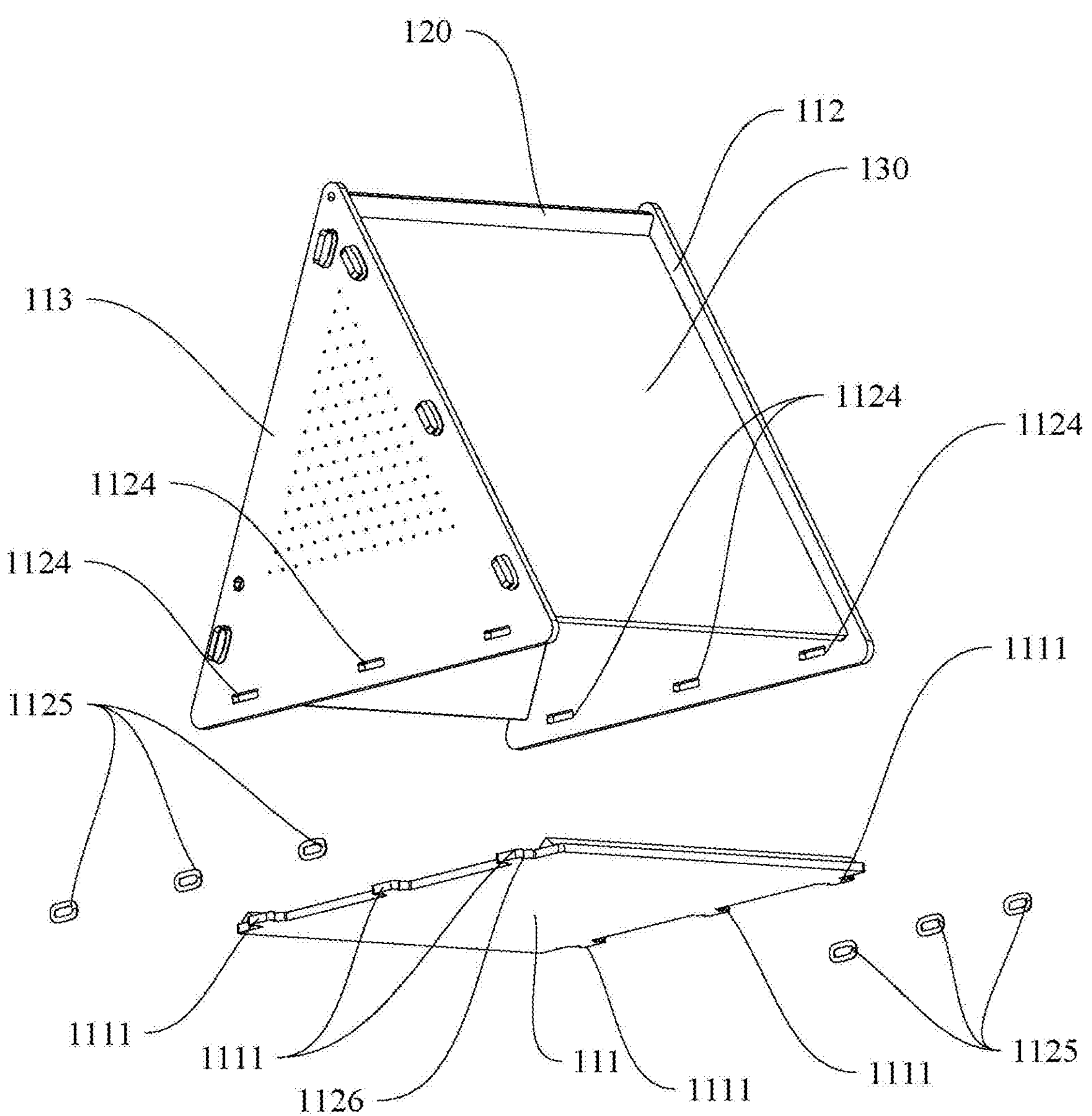
FIG. 11 is an exploded view of the connection structure among a left side panel, a right side panel, and a bottom panel.

In present embodiment, referring to FIG. 11, the frame assembly 100 further includes a left side panel 112 and a right side panel 113 arranged opposite to the left side panel 112. The left side panel 112 and the right side panel 113 are respectively arranged at two sides of the bottom panel 111, and the left side panel 112 and the right side panel 113 are detachably connected to the bottom panel 111. Specifically, both end side walls of the bottom panel 111 are provided with at least one third engaging column 1111. Bottom ends of the left side panel 112 and the right side panel 113 are each provided with at least one third receiving hole 1124. The third engaging column 1111 is inserted into the third receiving hole 1124, so that the bottom panel 111, the left side panel 112, and the right side panel 113 are detachably connected. A third sealing rubber ring 1125 is arranged between the third engaging column 1111 and the third receiving hole 1124, and a third engaging recess 1126 is defined in the third engaging column 1111. The third sealing rubber ring 1125 is arranged in the third engaging recess 1126, so as to seal a fourth connection gap 1127 between the third engaging column 1111 and the third receiving hole 1124. Preferably, both end side walls of the bottom panel 111 are both provided with three third engaging columns 1111. The bottom ends of the left side panel 112 and the right side panel 113 are each provided with three third receiving holes 1124. Through the above structure, the left side panel 112, the right side panel 113, and the bottom panel 111 are all stably and reliably connected. Moreover, the third sealing rubber ring 1125 is configured for sealing the fourth connection gap 1127 between the third engaging column 1111 and the third receiving hole 1124, so as to prevent pets of small size from escaping through the gap.

In other embodiments, the left side panel 112 and the right side panel 113 are fixedly connected to the bottom panel 111. Specifically, the left side panel 112 and the right side panel 113 can be fixedly connected to the bottom panel 111 by adhesive bonding, welding, or other connection methods, thereby enabling the pet enclosure 10 to have a more stable structure. In addition, the left side panel 112 and the right side panel 113 may also be integrally formed with the bottom panel 111.

In present embodiment, a plurality of ventilation holes 1128 are defined in the left side panel 112 and the right side panel 113, and a diameter of the ventilation hole 1128 is in a range from 0.1 mm to 1000 mm. Preferably, the diameter of the ventilation hole 1128 is in a range from 0.1 mm to 1 mm. The ventilation holes 1128 can facilitate air exchange between the interior and exterior of the housing space 101, which maintains internal air circulation. Therefore, this ensures suitable environment for the pets in the housing space 101.

In present embodiment, at least one portion of a cross section of the housing 100 is in a shape of a triangle. Preferably, the cross section of the housing 100 is in a shape of a triangle. This structure of the triangular cross section provides the pet enclosure 10 with enhanced stability. In other embodiments, the housing 100 may have a composite cross section combining a rectangular base portion and a triangular top portion.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the frame assembly is provided with an opening, the first side panel comprises a lower side panel and an upper side panel, the lower side panel is connected to a lower side of the frame assembly, and the upper side panel is rotatably connected to the frame assembly, so as to cover the opening; an inner wall of the upper side panel abuts against a top edge of the second side panel, or an inner wall of the second side panel abuts against a top edge of the first side panel.

2. The pet enclosure according to claim 1, wherein the first viewing area extends from a top end of the first side panel to a bottom end of the first side panel, and the second viewing area extends from a top end of the second side panel to a bottom end of the second side panel.

3. The pet enclosure according to claim 1, wherein the angle between the first side panel and the bottom panel is in a range from 1 degrees to 89.9 degrees, and/or the angle between the second side panel and the bottom panel is in a range from 1 degrees to 89.9 degrees; the angle between the first side panel and the bottom panel is in a range from 1 degrees to 90 degrees, and the angle between the second side panel and the bottom panel is in a range from 1 degrees to 89.9 degrees; the angle between the first side panel and the bottom panel is in a range from 1 degrees to 89.9 degrees, and the angle between the second side panel and the bottom panel is in a range from 1 degrees to 90 degrees.

4. The pet enclosure according to claim 1, wherein an area of the upper side panel accounts for 10% to 100% of an area of the first side panel.

5. The pet enclosure according to claim 1, wherein blocking bars are arranged on both ends of the bottom panel, and/or blocking bars are arranged on both ends of the first side panel, and/or blocking bars are arranged on both ends of the second side panel; outer sides of the blocking bars respectively abut against an inner surface of the first side panel and an inner surface of the second side panel; an inner side of the blocking bar is provided with an inclined guiding surface, and the inclined guiding surface is configured for leading bedding material inside the housing space to be at a central area of the bottom panel.

6. The pet enclosure according to claim 5, wherein the blocking bar has a shape of a triangular prism, a cylinder, a rectangular prism, a polygonal prism, an ellipsoid, or a semi-cylinder.

7. The pet enclosure according to claim 1, wherein at least one portion of a cross section of the housing is in a shape of a triangle.

8. The pet enclosure according to claim 1, wherein the frame assembly further comprises a left side panel and a right side panel arranged opposite to the left side panel, the left side panel and the right side panel are respectively arranged at two sides of the bottom panel, and the left side panel and the right side panel are connected to the bottom panel.

9. The pet enclosure according to claim 8, wherein a plurality of ventilation holes are defined in the left side panel and the right side panel, and a diameter of the ventilation hole is in a range from 0.1 mm to 1000 mm.

10. The pet enclosure according to claim 8, wherein the left side panel and the right side panel are each detachably connected to, fixedly connected to, or integrally formed with the bottom panel.

11. The pet enclosure according to claim 10, wherein two end side walls of the bottom panel are provided with at least one third engaging column, bottom ends of the left side panel and the right side panel are each provided with at least one third receiving hole, and the third engaging column is inserted into the third receiving hole, so that the bottom panel, the left side panel, and the right side panel are detachably connected; a third sealing rubber ring is arranged between the third engaging column and the third receiving hole, a third engaging recess is defined in the third engaging column, and the third sealing rubber ring is arranged in the third engaging recess, so as to seal a fourth connection gap between the third engaging column and the third receiving hole.

12. The pet enclosure according to claim 1, wherein the first side panel and the second side panel are each detachably connected to, fixedly connected to, or integrally formed with the frame assembly.

13. The pet enclosure according to claim 12, wherein two end side walls of the first side panel and of the second side panel are respectively provided with at least one first engaging column, two sides of the frame assembly are respectively provided with at least one first receiving hole, and the first engaging column is inserted into the first receiving hole, so that the first side panel and the second side panel are each detachably connected to the frame assembly.

14. The pet enclosure according to claim 13, wherein a first sealing rubber ring is arranged between the first engaging column and the first receiving hole, a first engaging recess is defined in the first engaging column, and the first sealing rubber ring is arranged on the first engaging recess, so as to seal a first connection gap between the first engaging column and the first receiving hole.

15. The pet enclosure according to claim 12, wherein the first side panel and the second side panel are each connected to the frame assembly via adhesive.

16. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the first side panel comprises a lower side panel and an upper side panel, the lower side panel is connected to a lower side of the frame assembly, and the upper side panel is rotatably connected to the frame assembly, so as to cover an opening of the frame assembly; an inner wall of the upper side panel abuts against a top edge of the second side panel, protruding shafts are arranged at both sides of a bottom end of the upper side panel, connecting holes are defined in both sides of the frame assembly, and the protruding shaft is rotatably arranged in the connecting hole, so that the bottom end of the upper side panel is rotatably connected to the frame assembly.

17. The pet enclosure according to claim 16, wherein an extension panel is arranged on an inner side wall of the bottom end of the upper side panel, when the upper side panel covers the opening, an inner wall surface of the extension panel abuts against an inner wall surface of the lower side panel, so as to cover a first gap between the upper side panel and the lower side panel.

18. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the frame assembly is provided with an opening, the first side panel comprises a lower side panel and an upper side panel, wherein the upper side panel is magnetically connected to the housing, at least one first magnetic member is arranged on a top end of the upper side panel, a protective nesting partition is arranged between the frame assemblies, at least one second magnetic member is arranged on the protective nesting partition, and the first magnetic member is magnetically connected to the second magnetic member, so that the upper side panel is capable of covering the opening.

19. The pet enclosure according to claim 18, wherein when the upper side panel covers the opening, a second gap is formed between the first magnetic member and the second magnetic member.

20. The pet enclosure according to claim 18, wherein the protective nesting partition is detachably connected to, fixedly connected to, or integrally formed with the frame assembly.

21. The pet enclosure according to claim 20, wherein both ends of the protective nesting partition are each provided with at least one second engaging column, both sides of the frame assembly are each provided with at least one second receiving hole, and the second engaging column is inserted into the second receiving hole, so that the protective nesting partition is detachably connected to the frame assembly; a second sealing rubber ring is arranged between the second engaging column and the second receiving hole, a second engaging recess is defined in the second engaging column, and the second sealing rubber ring is arranged on the second engaging recess, so as to seal a third connection gap between the second engaging column and the second receiving hole.

22. The pet enclosure according to claim 20, wherein the protective nesting partition is connected to the frame assembly via adhesive.

23. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the first side panel comprises a lower side panel and an upper side panel, the lower side panel is connected to a lower side of the frame assembly, and the upper side panel is rotatably connected to the frame assembly, so as to cover an opening of the frame assembly, at least one mounting hole is defined in a top end of the housing, the mounting hole is configured for allowing a hanging rope or a pin to pass through, and when the upper side panel covers the opening, the mounting hole is exposed on an outer side of the upper side panel; when the mounting hole is configured for allowing a pin to pass through, the pin inside the mounting hole is configured for retaining the upper side panel in a covered state.

24. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the frame assembly is provided with an opening, the first side panel comprises a lower side panel and an upper side panel, the lower side panel is connected to a lower side of the frame assembly, and the upper side panel is rotatably connected to the frame assembly, so as to cover the opening.

25. A pet enclosure, comprising:

a housing, the housing comprising a housing space configured for accommodating a pet;

the housing comprising a frame assembly, a first side panel, and a second side panel, wherein the first side panel and the second side panel are arranged at both sides of the frame assembly respectively, and the first side panel and the second side panel are arranged adjacent to each other and are connected together, so as to form the housing space;

wherein the frame assembly comprises a bottom panel, the first side panel is arranged at an inclined angle relative to the bottom panel, and/or the second side panel is arranged at an inclined angle relative to the bottom panel; the first side panel is provided with a first transparent viewing area, the second side panel is provided with a second transparent viewing area, and the first viewing area and the second viewing area are configured for viewing the pet inside the housing space;

wherein the frame assembly is provided with an opening, the first side panel comprises a lower side panel and an upper side panel;

wherein an extension panel is arranged on an inner side wall of the bottom end of the upper side panel;

wherein two end portions of the extension panel are configured for covering a second connection gap between the protruding shaft and an inner side of the connecting hole.

* * * * *